No. 835,445. PATENTED NOV. 6, 1906.
E. C. LEONARD.
ARTIFICIAL TREE.
APPLICATION FILED JUNE 30, 1906.
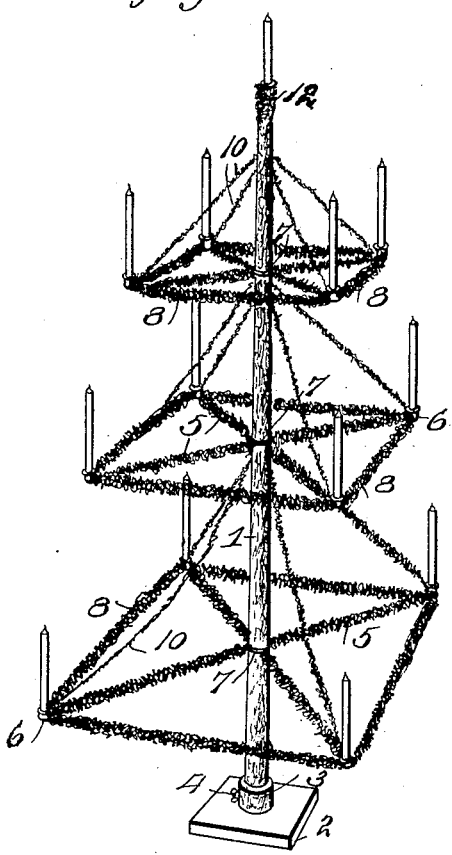
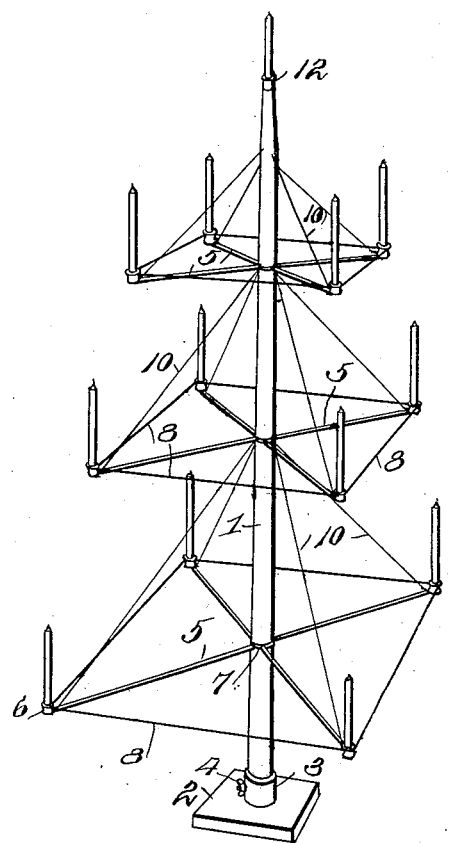
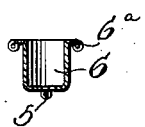
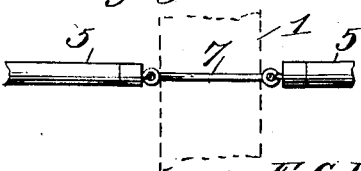
Witnesses
Frank Hough
Harry M. Test
Inventor
E. C. Leonard
By Victor J. Evans
Attorney

UNITED STATES PATENT OFFICE.

EVA CHARLOTTA LEONARD, OF THOMPSON, PENNSYLVANIA.

ARTIFICIAL TREE.

No. 835,445.　　　Specification of Letters Patent.　　　Patented Nov. 6, 1906.

Application filed June 30, 1906. Serial No. 324,242.

*To all whom it may concern:*

Be it known that I, EVA CHARLOTTA LEONARD, a citizen of the United States of America, residing at Thompson, in the county of Susquehanna and State of Pennsylvania, have invented new and useful Improvements in Artificial Trees, of which the following is a specification.

This invention relates to improvements in artificial or Christmas trees, the object of the invention being to provide a device of this character which may be used as a substitute for the natural tree and which is designed to be folded or arranged in compact form for storage or shipment.

In the drawings, Figure 1 is a perspective view of the improved artificial tree. Fig. 2 is a similar view of the tree with the branch trimmings removed. Fig. 3 is a detail section showing the manner of mounting the branch arms. Fig. 4 is a section through one of the candle holders or sockets.

Referring to the drawings, the numeral 1 designates a staff composing the body or trunk of the tree and which may be suitably finished to simulate the natural trunk. This staff may be supported in practice in any suitable form of holder. In the present instance a base 2 is provided, which has a socket 3 to receive the lower end of the staff and is furnished with a clamping-screw 4 to secure the same therein. The staff carries superposed tiers or rows of branches, which gradually diminish in extent of outward projection toward the top thereof after the manner of the natural tree. Each set of branches comprises a series of radial arms 5, preferably formed by metallic rods, each rod being provided at its outer end with a candle holder or socket 6 or any other suitable ornament-supporting fixture and hinged or pivoted at its inner end, as shown at 6, to a supporting ring or band 7, surrounding the staff and forming a common support for all the associated branch arms. The arms are connected and stayed at their outer ends by a bracing wire or wires 8, which wire or wires extend around the set of holders 6 and take under the rims 6ᵃ thereof. This construction permits the rods 5 to be folded substantially parallel with the staff 1 after the wires 8 are disconnected, so that the parts may be disposed or arranged in compact form to be packed into a box for storage or shipment. Supporting-wires 10 connect at their lower ends with the rods and at their upper ends with the staff or superposed ring and serve to prevent the arms from dropping downward. These wires may be arranged in any suitable manner to permit of their ready disconnection when it is desired to take down the tree. The rods and wires are covered with trimmings 11, consisting either of natural evergreens or green paper simulating the same or the spurs of the branches of the natural tree. The staff may be provided with a holder or fixture 12 at its upper end to support a candle or other suitable ornament. Candles 13 are shown in the present instance supported in the holders or fixtures 12.

It will be apparent that the invention provides a simple form of artificial tree which may be inexpensively manufactured, which may be made as ornamental in appearance as desired, and packed in convenient form for storage or shipment.

Having thus described the invention, what is claimed as new is—

1. An artificial tree comprising a trunk-staff, rigid folding branch arms pivotally connected with the staff, and means for supporting said branch arms in operative position.

2. An artificial tree comprising a trunk-staff, rings or bands carried by the staff, rigid folding branch arms pivotally connected with said rings, and means for supporting said branch arms in operative position.

3. An artificial tree comprising a trunk-staff, branch arms extending from said staff, stays connecting the outer ends of the arms in series, and supports coacting with said stays to sustain the arms in position.

4. An artificial tree comprising a trunk-staff, branch arms radiating from the staff and provided at their outer ends with holding fixtures, stays engaging said fixtures and connecting the arms in series, and supports coacting with the stays to sustain the arms in position.

5. An artificial tree comprising a trunk-staff, rings or bands carried by the staff, radial branch arms pivoted to the rings, holding fixtures upon the outer ends of the arms, stays connected with the fixtures and coupling the arms in series, and supports coöperating with said stays to sustain the arms in operative position.

6. An artificial tree comprising a trunk-staff having rigid folding branch arms, and means for staying and supporting said arms in operative position.

In testimony whereof I affix my signature in presence of two witnesses.

EVA CHARLOTTA LEONARD.

Witnesses:
H. M. BLOXHAM,
F. M. TALLMAN.